June 16, 1959

W. SHOCKLEY 2,891,171

TRANSISTOR SWITCH

Filed Sept. 3, 1954

2 Sheets-Sheet 1

INVENTOR.
WILLIAM SHOCKLEY

BY Christie, Parker, and Hale

ATTORNEYS

June 16, 1959 W. SHOCKLEY 2,891,171

TRANSISTOR SWITCH

Filed Sept. 3, 1954 2 Sheets-Sheet 2

INVENTOR.
WILLIAM SHOCKLEY

BY Christie, Parker and Hale

ATTORNEYS 2,891,171

TRANSISTOR SWITCH

William Shockley, Madison, N.J., assignor, by mesne assignments, to Consolidated Electrodynamics Corporation, Pasadena, Calif., a corporation of California Application September 3, 1954, Serial No. 454,060

4 Claims. (Cl. 307—88.5)

This invention relates to transistor circuits, and more particularly to signal transfer circuits including semi-conductor current flow control means to switch, sample, or modulate an electrical current.

The operation of transistors in controlling the flow of an electrical current, by varying the potentials across point contacts or junctions of a semi-conductor material including a significant amount of impurities, is well known. However, in the case of a junction transistor including zones of alternately opposite conductivity types of a semi-conductor material, it has been found that the biasing of one of the junctions affects the potential appearing across the other of the junctions. For example, in the case of a p-n-p junction transistor, the biasing of one of the p-n junctions results in a variation in the potential appearing across the other p-n junction. This phenomenon is described in an article entitled "P-n Junction Transistors," by W. Shockley, M. Sparks and G. K. Teal, appearing at page 151 of the Physical Review, volume 83, No. 1. Additional references of a general nature are an article entitled "The Theory of p-n Junctions in Semi-conductors and p-n Junction Transistors," by W. Shockley, appearing at page 335 of the Bell System Technical Journal for July 1949, volume 28, No. 3, and a book entitled "Electrons and Holes in Semi-conductors," by W. Shockley, published by the D. Van Nostrand Company in New York in 1950.

Where a single p-n-p or n-p-n transistor is used as a switching element, the nature of the variation in the potential appearing at one junction as a result of the biasing of another junction may result in a spurious signal being introduced by the switching circuit.

In accordance with my invention, I provide an improved transistor circuit which may be employed to control the passage of an electrical current without introducing spurious signals. One embodiment of my invention includes a semi-conductor device having zones of alternately opposite conductivity types which are arranged in a predetermined manner, so that the potentials appearing across at least two junctions are canceled by potentials appearing across at least two other junctions, and means for selectively biasing at least two zones of like conductivity type to control the flow of electrical current through the semi-conductor device.

A better understanding of my invention may be had upon a reading of the following detailed description and an inspection of the drawings, in which.

In general, a switch may be defined as a two-terminal device having characteristics which may be controlled by external means between open and closed conditions. In the open condition in an ideal switch no current flows through the switch regardless of the voltage applied between the terminals, while in the closed condition no voltage appears across the switch regardless of the current passed. Ideally, the current passed by the switch in the closed condition should be substantially the same as that which would flow through a short circuit and the current passed in the open circuit condition should be negligible.

In any actual switch these conditions are never perfectly satisfied, and are particularly difficult to meet in a quick acting switch employing electronic switching when the voltage source of the external circuit is low, say of the order of one millivolt, because of spurious voltages which develop between the terminals of the switch owing to the fact that the electronic processes which cause the switch to close usually also generate voltages. My invention avoids these difficulties to a previously unattainable degree by making use of the characteristics of transistors together with certain balancing principles.

Figure 1:
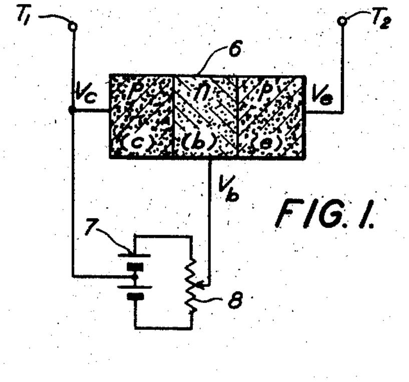
Fig. 1 is a schematic circuit diagram of a transistor switch.

The circuitry of Fig. 1 includes a p-n-p junction transistor 6 having zones of alternately opposite conductivity types. The right-hand p zone may be termed an emitter (*e*), the intermediate n zone may be termed as base (*b*), and the left-hand p zone may be termed a collector (*c*). The region of contact between each of these zones is known as a p-n junction. Thus, the transistor 6 includes an emitter-base junction and a base-collector junction. The discussion will apply to the case of an ideal junction transistor although it will be evident from the subsequent discussion that the same principles may be applicable to other kinds of transistors. In Fig. 1, a center tapped source of voltage 7 and a potentiometer 8 are arranged so that the base-collector junction may be biased in either direction by adjustment of the sliding contact on the potentiometer 8.

Figure 2:
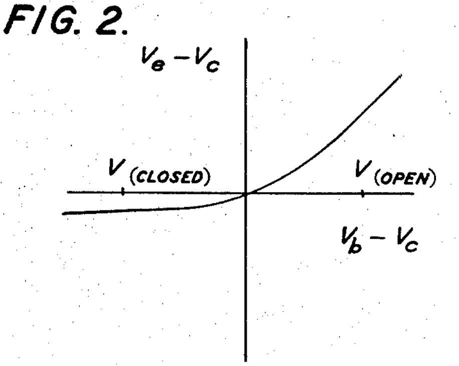
Fig. 2 is a graphical illustration showing the relationship between the potentials in the transistor of Fig. 1.

From the above cited references on junction transistors, it can readily be established by mathematical analysis that the voltage developed on the emitter produced by the voltages applied between the collector and the base will be as shown in Fig. 2. These voltages can be measured by connecting voltmeters across the terminals of the transistor. Of particular importance is that $V_e - V_c$ reaches a substantially constant negative value as the negative value of $V_b - V_c$ is increased. For brevity, we shall refer to the limiting value of $V_e - V_c$ as the "saturation voltage." The saturation voltage is closely approached when $V_b$ is more negative than $V_c$ by about four times the "thermal voltage" of $kT/q$ where $k$=Boltzmann's constant, $T$=absolute temperature, and $q$=absolute value of electronic charge as defined in the references. At room temperature $kT/q$ has a value of about 25 millivolts so that four times $kT/q$ is about one-tenth of a volt.

The physical reason that the limit is reached is that negative potentials on $V_b$ in respect to $V_c$ produce forward biases across the p-n junction between the collector and the base. This leads to the injection of holes into the base and subsequent diffusion to the emitter. This flow of holes from collector to emitter compensates for the tendency of the emitter to assume the potential of the base in which it is in contact. This phenomenon of an open circuited junction acquiring a potential across itself is referred to as an "internal contact potential" and has been discussed in the above references. As a result of this effect, the saturation value of $V_e-V_c$ is $(kT/q)ln$ (alpha) where alpha equals the short circuit gain as defined in the usual manner for the transistor and $ln$ (alpha) is the Napierian logarithm of alpha.

In most applications of a transistor switch it is desirable to keep the saturation voltage as small as possible. This can be accomplished by choosing a transistor with alpha approximately equal to unity. In general, junction transistors are so constructed that their alpha values are nearer unity when they are operated normally than when the roles of emitter and collector are interchanged. We shall accordingly use the word emitter to designate the terminal unconnected to the control circuit and the words collector and base for the two terminals between which the control voltages are applied. However, for some applications such as those in which relatively high voltages may appear across terminals $T_1$ and $T_2$ in the open condition, it may be desirable to interchange the roles of the emitter and collector. It is evident that the considerations discussed herein will apply to such cases if the words emitter and collector are interchanged and the quantity alpha is measured consistently with the interchanged arrangement.

As is well known in the art, the density of injected carriers in a p-n-p increases exponentially with forward bias across a junction. Since the injected holes in the base region furnish a current path between the emitter and the collector terminals, a low resistance path or closed condition is produced by negatively biasing the base with respect to collector such as V (closed) of Fig. 2. This condition corresponds to the solid line of Fig. 3. On the other hand, a reverse bias such as V (open) prevents the flow of holes from the collector to the base and induces a positive voltage on the emitter in respect to the collector. This leads to the dashed type of current voltage line shown on Fig. 3. Under these conditions the switch passes only the small saturation current of the reverse biased junction between the emitter and the base unless $V_e$ becomes more positive than $V_b$. Since $V_b$ can be controlled, as indicated below, in designing the switch, this limitation is not particularly serious.

Figure 3:
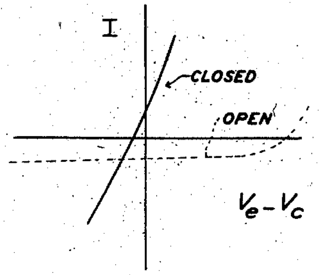
Fig. 3 is a graphical illustration showing the relationship of current and voltage between the terminals $T_1$ and $T_2$ of Fig. 1.

The ratio of the slopes of the lines of Fig. 3 may be made to differ by a factor of ten thousand or more. Furthermore, the resistance in the closed condition may be made arbitrarily low by using large negative currents into the base and transistors of large area or several transistors in parallel. The saturation current in the open condition may be reduced by operating at reduced temperatures or by using transistors of inherently low reverse currents, such as silicon transistors. From these considerations it is evident that the circuit of Fig. 1 will act as a satisfactory switch for many applications. However, if the voltage in the external circuit is not large compared to the saturation voltage, then the current flowing through the switch will not accurately be proportional to the applied voltage. In effect, the saturation voltage appears as a spurious voltage which may invalidate measurements using the circuit of Fig. 1 as a switch.

Figure 4:
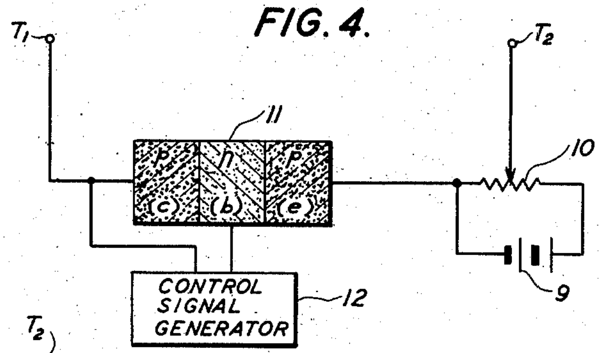
Figs. 4 and 5 are switching circuits, each including a transistor and means for reducing spurious switching voltages.
Figure 5:
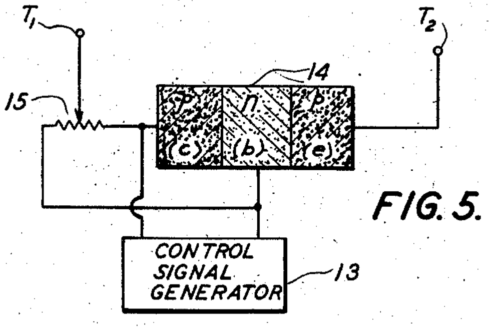

In my invention I utilize the fact that the saturation voltage $kT/qln$ (alpha) is small and stable. For example, if alpha is 0.9 or 0.99 respectively, then the saturation voltage is about 2.5 or 0.25 millivolts respectively. Thus selection of transistors with values of alpha near unity can reduce the spurious voltage. In the second place, the saturation voltage is independent of the control voltage applied to the base. This permits the use of control circuits which need not have highly stabilized characteristics. In the third place, alpha is less sensitive to temperature than many transistor parameters so that the saturation voltage is relatively temperature insensitive. Because of these stability features an improved transistor switch may be constructed by adding in series with the transistor switch a low impedance source of bias voltage equal and opposite to the saturation voltage. These voltages oppose each other when the switch is closed so that the spurious voltage is reduced to a low value. This objective may be achieved by connecting a battery 9 and potentiometer 10 in series with a transistor 11 as shown in Fig. 4, and applying a voltage from the control signal generator 12 to open and close the switch. Alternatively, as in Fig. 5, a voltage from the control generator 13 which is applied to the transistor 14 may be applied across the potentiometer 15. This has the advantage of eliminating one voltage source, but requires a greater degree of stability in the control signal source.

Figure 6:
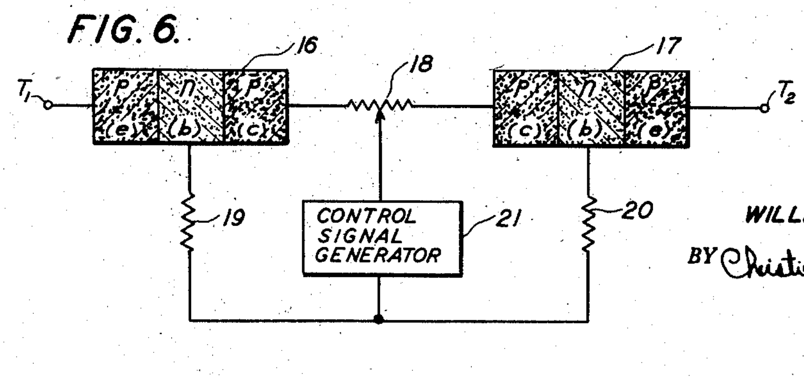
Fig. 6 is a combination block and schematic circuit diagram of a switching circuit including a pair of transistors.

A more effective method of eliminating the spurious voltage is to use a symmetrical circuit. One such circuit is shown in Fig. 6. If the transistors 16 and 17 have identical characteristics, their saturation voltages will cancel and no spurious voltage will be developed in either the open or closed condition. Furthermore, if the transistors are in the same environment and have the same temperature coefficients, the condition of balance will prevail under changing temperature conditions.

The advantage of this circuit may be understood in quantitative terms by noting that the spurious voltage is $(kT/q)ln(A/A')$ where A and A′ are the alphas of the two transistors 16 and 17. Although transistors having alpha values between 0.99 and unity may be relatively hard to produce, in a group of 100 transistors having alpha values between 0.9 and 1.0, there probably will be at least one pair for which $A/A'$ differs from unity by less than 0.001. Such a pair will give a value of $(kT/q)ln(A/A')$ less than 0.025 millivolt. This reasoning shows quantitatively the advantage of the balanced circuit.

Since actual junction transistors do not perfectly fulfill theory, the saturation voltage will not perfectly saturate and there may be terms that vary somewhat with control current. The effect of such terms and their compensation may be accomplished with the aid of the circuit of Fig. 6. By adjustment of the potentiometer 18, an additional spurious voltage can be introduced of opposite sign and magnitude to compensate for that due to the difference in the transistors. Since almost complete balance is achieved by the paired transistors, the voltage correction produced by the potentiometer 18 is smaller than for the one transistor circuit and thus need not be so critically controlled. Furthermore, since only a small correction is needed, the resistance of the potentiometer 18 may be of a low value which does not add any appreciable resistance to the circuit between the terminals $T_1$ and $T_2$.

Another feature of the circuit of Fig. 6 is the two equal resistors 19 and 20 which are connected in series with the control signal generator 21. If the resistors 19 and 20 have impedances which are large compared to the impedances of the forward biased junctions in the transistors, they will ensure that the transistors receive substantially equal control currents. Since the impedance is determined chiefly by the current through the transistor and the alpha value of the transistor, equal current division between the two transistors may be achieved, thereby resulting in a minimum resistance across the switch for a given magnitude of total control current. The resistors 19 and 20 also aid in stabilizing the currents through the compensating potentiometer 18.

The circuitry of Fig. 6 may be used as a sampler to generate a time division multiplexed signal by joining the end terminals of a plurality of such circuits, applying a channel of information to the other end terminals of each of the circuits and sequentially energizing the base zones of a pair of transistors of each of the circuits. In like manner, the separate signal components of a time division multiplexed signal may be derived by joining the end terminals of a plurality of such circuits, applying a time division multiplexed signal to the joined end terminals, and sequentially energizing the base zones of a pair of transistors of each of the circuits. As is well known in communications theory, the sampling process is substantially the same as a modulation process and therefore, the circuitry of Fig. 6 may be employed as a modulator by applying a signal to be modulated to the terminal $T_1$ and substituting a source of carrier wave for the control signal generator 21. Also, where a modulated wave is applied to the terminal $T_1$, and where a wave of the same frequency as the modulated wave is applied across the base-collector junction of each of the transistors, the circuit may be used as a synchronous demodulator.

Figure 7:
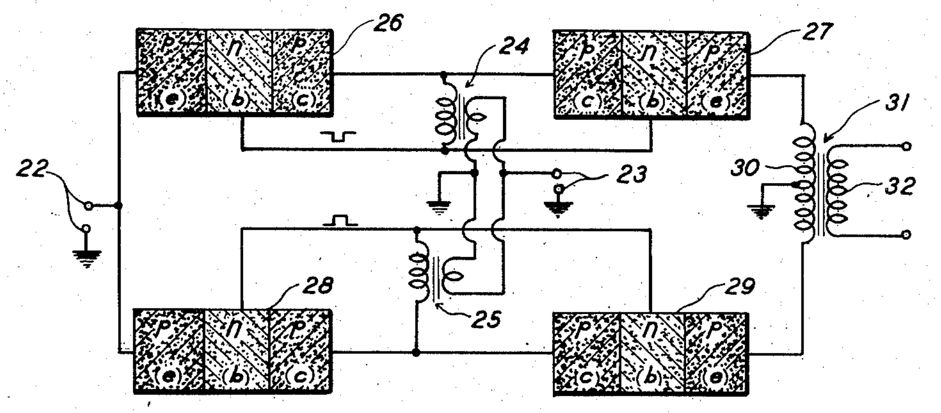
Fig. 7 is a schematic circuit diagram of a full wave transistor switching or modulating circuit.

Another application for the circuitry of Fig. 6 is shown in Fig. 7, where two such circuits are combined to function in a manner similar to a full wave vibrator of the type commonly used in self-balancing servo-mechanisms to generate an alternating current signal which is amplitude modulated in accordance with a direct current signal.

A signal may be applied across the terminals 22 of Fig. 7 and an alternating current carrier wave may be applied across the terminals 23. The windings of the transformers 24 and 25 are arranged so that when the base-collector junctions of the transistors 26 and 27 are biased in one direction, the base-collector junctions of the transistors 28 and 29 are biased in the opposite direction. By this means the signal applied to the terminals 22 may be passed via the transistors 26 and 27 on one half cycle of the wave applied to the terminals 23, and passed by the transistors 28 and 29 on the other half cycle of the wave applied to the terminals 23.

The signals passed by the transistors 26—29 appear across the primary winding 30 of an output transformer 31 and across the secondary winding 32 of the transformer 31 appears an alternating current signal of the frequency of the wave applied to the terminals 23, which is amplitude modulated in accordance with the signal applied to the terminals 22.

Figure 8:
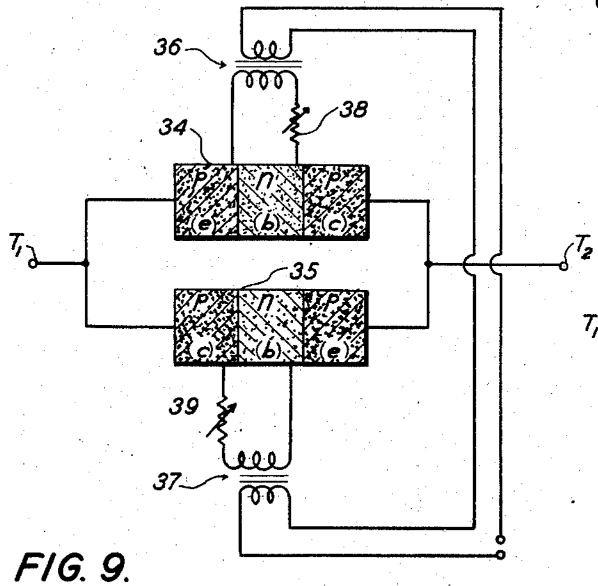
Figs. 8 and 9 are schematic circuit diagrams of switching circuits, each of which includes a pair of transistors.

Another circuit employing a symmetrical arrangement of transistors 34 and 35, and in which the control to the transistors is applied via the transformers 36 and 37, is shown in Fig. 8. The transistors 34 and 35 are connected in parallel and minor adjustments for inequality of the two alpha values may be accomplished by varying the strength of the control current by means of the variable resistors 38 and 39. This variation does not affect the saturation voltage of the transistors 34 and 35 but does vary the resistance in the closed condition. Since the transistors 34 and 35 produce saturation voltages of opposite polarity between the terminals of the switch, the resultant voltage may be reduced to zero by adjusting the resistors 38 and 39. This circuit has about four times lower resistance for the closed condition than has a series arrangement, such as that of Fig. 6. In order to have a low saturation voltage from each transistor, the alpha values should be near unity. In addition, in order to have balance in the resistance values, the alpha values measured with roles of emitter and collector interchanged should also be nearly equal.

Figure 9:
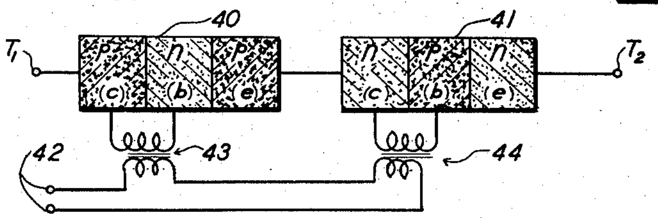

Similar circuits may be designed using n-p-n junction transistors in combination with p-n-p junction transistors by making use of symmetrical arrangements and the balance of spurious voltages due to alpha differences. An example of this type of circuit is shown in Fig. 9, in which the spurious voltage of the p-n-p transistor 40 is of opposite polarity to the spurious voltage of the n-p-n transistor 41. If the alpha value of each of the transistors is the same, the saturation voltages will be canceled. This series arrangement is similar to that discussed for similar transistors in Fig. 6. However, the polarity of one of the transistors is reversed, the compensating potentiometer 18 is omitted, and the control voltage is applied to the transistors via the terminals 42 and the transformers 43 and 44.

Figure 10:
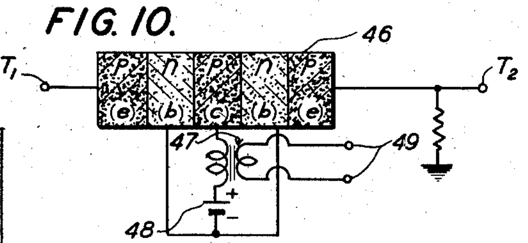
Figs. 10 and 11 are schematic circuit diagrams of switching circuits, each of which includes a single transistor.

In Fig. 10 is shown an embodiment of my present invention in which a single transistor 46 is constructed to function in a manner similar to the pair of transistors shown in Fig. 6. In the transistor 46 zones of alternate conductivity types are arranged so that a single zone functions as a collector zone for a pair of base zones and a pair of emitter zones.

A source of switching or modulating signals may be applied across the base-collector junction of the transistor 46 by a transformer 47. If desired, a biasing source, such as a battery 48, may be connected serially with the secondary winding of the transformer 47. If the battery is of one polarity, the conductance between the terminals $T_1$ and $T_2$ will be maintained high, i.e., the switch will be closed, except when a switching signal is applied to the terminals 49. On the other hand, if the battery 48 is of opposite polarity, the conductance between the terminals $T_1$ and $T_2$ will be maintained at a relatively low level, i.e., the switch will be open, except when a switching signal is applied to the terminals 48.

If the switch of Fig. 10 is to be alternately opened and closed for approximately equal intervals, the battery 48 may be omitted, since an alternating current wave appearing across the secondary of the transformer 47 will be centered around an intermediate potential at which the switch is half way open. Consequently, the excursions of the alternating current wave will alternately open and close the switch.

Figure 11:
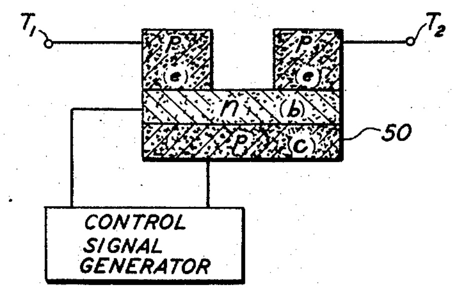

Fig. 11 shows another embodiment of the invention utilizing a single transistor 50 having a common base layer, a common collector region, and two separate emitter regions. In operation, the circuit of Fig. 11 is similar to that of Fig. 10.

From the foregoing it will be appreciated that the following underlying principle is involved in the invention. The current flowing between the two terminals must pass through an emitter junction; in some cases it passes through two junctions in series and in other cases it divides so that part of the current flows across one junction and part across another. The resistance to current flow between the terminals is thus high when the collector junctions are biased reverse and low when they are biased forward. When the junctions are biased forward, internal contact potentials are developed between emitter and collector bodies in the semiconductor devices employed. These internal contact potentials are prevented from producing spurious voltages by compensation means which may comprise either cancellation of one or more internal contact potentials by one or more other internal contact potentials or by other compensating sources of voltage.

I claim:

1. A transfer circuit comprising a transistor including a pair of terminals, at least two p–n junctions, and means connecting said p–n junctions between said terminals, control means for applying a voltage of reversible polarity across one of said p–n junctions whereby current may be selectively passed or substantially blocked between the terminals, and means for compensating for the spurious potential developed across said p–n junctions when the control voltage is set to pass current between the terminals.

2. Apparatus as defined in claim 1 wherein said compensating means includes means for producing a potential in series with the spurious potential between the terminals having a value substantially equal to $$\frac{kT}{q} ln(A)$$

where $k$ is Boltzmann's constant, T is absolute temperature, $q$ is the absolute value of electronic charge, and A is the alpha value of the transistor.

3. Apparatus as defined in claim 1 wherein said compensating means includes an additional pair of p–n junctions connected in series with the first-mentioned p–n junctions between said terminals, said control means being connected to apply a voltage of reversible polarity to one of said additional junctions, the additional junctions producing a spurious potential in series with the spurious potential produced across the first-mentioned pair of junctions which is substantially equal and opposite in polarity, whereby the net spurious potential generated between the terminals is reduced to substantially zero.

4. Apparatus as defined in claim 1 wherein said compensating means includes an additional pair of p–n junctions connected in parallel with said first-mentioned p–n junctions between said terminals, said control means being connected for applying a voltage of reversible polarity across one of said additional p–n junctions.

References Cited in the file of this patent

UNITED STATES PATENTS

| | | |
|---|---|---|
| 2,569,347 | Shockley | Sept. 25, 1951 |
| 2,728,857 | Sziklai | Dec. 27, 1955 |
| 2,791,644 | Sziklai | May 7, 1957 |